(12) United States Patent
Zeng et al.

(10) Patent No.: US 12,554,774 B2
(45) Date of Patent: Feb. 17, 2026

(54) GRAPH DATA LOADING

(71) Applicant: Alipay (Hangzhou) Information Technology Co., Ltd., Hangzhou (CN)

(72) Inventors: Xintan Zeng, Hangzhou (CN); Guowei Zhang, Hangzhou (CN); Yongchao Liu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 160 days.

(21) Appl. No.: 18/572,712

(22) PCT Filed: Oct. 17, 2022

(86) PCT No.: PCT/CN2022/125707
§ 371 (c)(1),
(2) Date: Dec. 20, 2023

(87) PCT Pub. No.: WO2023/071848
PCT Pub. Date: May 4, 2023

(65) Prior Publication Data
US 2024/0289389 A1  Aug. 29, 2024

(30) Foreign Application Priority Data

Oct. 25, 2021  (CN) .......................... 202111240147.4

(51) Int. Cl.
*G06F 16/901* (2019.01)
*G06F 16/23* (2019.01)

(52) U.S. Cl.
CPC ...... *G06F 16/9024* (2019.01); *G06F 16/2343* (2019.01)

(58) Field of Classification Search
None
See application file for complete search history.

(56) References Cited

U.S. PATENT DOCUMENTS 9,767,161 B2 *  9/2017  Arrouye ............ G06F 16/24578
10,127,260 B2 *  11/2018  Goel .................... G06F 16/2393
(Continued)

FOREIGN PATENT DOCUMENTS

CN      102369518 A      3/2012
CN      113204382 A      8/2021
(Continued)

OTHER PUBLICATIONS

Chen et al. "G-Tran: Making Distributed Graph Transaction Fast" arXiv (Year: 2021).*
(Continued)

*Primary Examiner* — Amresh Singh
(74) *Attorney, Agent, or Firm* — Womble Bond Dickinson (US) LLP

(57) ABSTRACT

Embodiments of this specification provide a graph data loading method and apparatus. In the graph data loading method, in response to obtaining to-be-loaded graph data from the outside, a lock is obtained for the to-be-loaded graph data. A graph data loading identifier of the to-be-loaded graph data is determined based on a graph data loading identifier of previous loaded graph data stored in a graph data loading apparatus. Based on the graph data loading identifier of the to-be-loaded graph data, a corresponding storage location of the to-be-loaded graph data in a graph data storage space created in a local memory of a graph data processing device is determined. After the lock obtained for the to-be-loaded graph data is released, the to-be-loaded graph data is stored at the corresponding storage location in the graph data storage space.

18 Claims, 9 Drawing Sheets

(56) References Cited

U.S. PATENT DOCUMENTS 11,372,572 B2* 6/2022 Mishra .................. G06F 3/0605
2013/0263149 A1 10/2013 Dai et al.

FOREIGN PATENT DOCUMENTS

| CN | 113342507 A | 9/2021 |
|---|---|---|
| CN | 113688068 A | 11/2021 |
| WO | 2020000485 A | 1/2020 |

OTHER PUBLICATIONS

The International Search Report and Written Opinion for International Application No. PCT/CN2022/125707 mailed on Dec. 20, 2022.

* cited by examiner

| Data identifier | Graph data loading identifier |
|---|---|
| Data Id1 | 1 |
| Data Id2 | 2 |
| ... | ... |
| Data Idn | N |

GRAPH DATA LOADING

CROSS-REFERNECE TO RELATED APPLICATIONS

This application is a national stage entry of International Application No. PCT/CN2022/125707, filed on Oct. 17, 2022, which claims priority to Chinese Application No. 202111240147.4, filed on Oct. 25, 2021, the contents of which are incorporated herein by reference in their entirety.

TECHNICAL FIELD

Embodiments of this specification generally relate to the field of graph data processing, and in particular, to a graph data loading method and apparatus.

BACKGROUND

As a scale of graph data becomes larger and larger, storing graph data in a data storage medium or a data storage system located outside a graph data processing device becomes a trend of graph data storage. During graph data processing, the graph data needs to be loaded from the external data storage medium or data storage system into a local memory of the graph data processing device for later processing by the graph data processing device.

In the case of large-scale graph data, graph data loading is usually performed concurrently. In a concurrent graph data loading process, lock contention occurs. Lock contention greatly affects concurrent efficiency of graph data loading.

SUMMARY

In view of the foregoing, embodiments of this specification provide a graph data loading method and apparatus. By using the graph data loading method and apparatus, a lock holding time in a graph data loading process can be reduced, and lock contention in a concurrent loading process can be reduced, thereby improving concurrent efficiency of graph data loading.

According to an aspect of the embodiments of this specification, a graph data loading method is provided, including: obtaining, in response to obtaining to-be-loaded graph data from the outside, a lock for the to-be-loaded graph data; determining a graph data loading identifier of the to-be-loaded graph data based on a graph data loading identifier of previous loaded graph data stored in a graph data loading apparatus; releasing the lock obtained for the to-be-loaded graph data; and after lock release is completed, storing the to-be-loaded graph data at a corresponding storage location in a graph data storage space created in a local memory of a graph data processing device, where the corresponding storage location is determined based on the graph data loading identifier of the to-be-loaded graph data.

Optionally, in an example of the previous aspect, the storing the to-be-loaded graph data at a corresponding storage location in a graph data storage space created in a local memory of a graph data processing device can include: storing a data identifier and a data attribute of the to-be-loaded graph data at the corresponding storage location in the graph data storage space; or storing a data attribute of the to-be-loaded graph data at the corresponding storage location in the graph data storage space.

Optionally, in an example of the previous aspect, a determining process of the storage location is performed before the lock release process or after the lock release process.

Optionally, in an example of the previous aspect, the graph data storage space includes multiple memory blocks used to store graph data, each memory block has a fixed quantity of storage locations, a head address queue is maintained in the local memory of the graph data processing device, and the head address queue is used to sequentially store a head address of each memory block according to a creation time sequence. Correspondingly, the determining, based on the graph data loading identifier of the to-be-loaded graph data, a storage location of the to-be-loaded graph data in a graph data storage space created in a local memory of a graph data processing device can include: determining a storage location index of the to-be-loaded graph data in the graph data storage space based on the graph data loading identifier, where the storage location index includes a memory block index of a memory block and an offset in the memory block; obtaining a head address of the memory block from the head address queue based on the memory block index; and determining the storage location of the to-be-loaded graph data in the graph data storage space according to the obtained head address of the memory block and the offset.

Optionally, in an example of the previous aspect, the storing the to-be-loaded graph data at a corresponding storage location in the graph data storage space can include: determining whether a data size of the to-be-loaded graph data exceeds a storage size of the corresponding storage location in the graph data storage space; and when the data size of the to-be-loaded graph data does not exceed the storage size of the corresponding storage location in the graph data storage space, storing the to-be-loaded graph data at the corresponding storage location in the graph data storage space; or when the data size of the to-be-loaded graph data exceeds the storage size of the corresponding storage location in the graph data storage space, applying for a memory space for the to-be-loaded graph data from a free memory in the local memory of the graph data processing device, storing the to-be-loaded graph data to the applied memory space, and storing a space address of the applied memory space at the corresponding storage location in the graph data storage space.

Optionally, in an example of the previous aspect, the storing the to-be-loaded graph data at a corresponding storage location in the graph data storage space can include: determining whether a data type of a data attribute of the to-be-loaded graph data includes a variable type; and when the data type of the data attribute of the to-be-loaded graph data does not include the variable type, storing the to-be-loaded graph data at the corresponding storage location in the graph data storage space; or when the data type of the data attribute of the to-be-loaded graph data includes the variable type, applying for a memory space for the to-be-loaded graph data from a free memory in the local memory of the graph data processing device, storing the to-be-loaded graph data to the applied memory space, and storing a space address of the applied memory space at the corresponding storage location in the graph data storage space.

Optionally, in an example of the previous aspect, a mapping table used to record a mapping relationship between a data identifier of graph data and a graph data loading identifier is maintained in the graph data loading apparatus. The graph data loading method can further include: after the graph data loading identifier of the to-beloaded graph data is obtained, recording a mapping relationship between the obtained graph data loading identifier and a data identifier of the to-be-loaded graph data into the mapping table.

According to another aspect of the embodiments of this specification, a graph data loading apparatus is provided, including: a lock acquisition unit, configured to obtain, in response to obtaining to-be-loaded graph data from the outside, a lock for the to-be-loaded graph data; an identifier determining unit, configured to determine a graph data loading identifier of the to-be-loaded graph data based on a graph data loading identifier of previous loaded graph data stored in a graph data loading apparatus; a lock release unit, configured to release the lock obtained for the to-be-loaded graph data; a storage location determining unit, configured to determine, based on the graph data loading identifier of the to-be-loaded graph data, a storage location of the to-be-loaded graph data in a graph data storage space created in a local memory of a graph data processing device; and a graph data storage unit, configured to: after lock release is completed, store the to-be-loaded graph data at the corresponding storage location in the graph data storage space.

Optionally, in an example of the previous aspect, the graph data storage unit loads a data identifier and a data attribute of the to-be-loaded graph data at the corresponding storage location in the graph data storage space, or loads a data attribute of the to-be-loaded graph data at the corresponding storage location in the graph data storage space.

Optionally, in an example of the previous aspect, the graph data storage space includes multiple memory blocks used to store graph data, each memory block has a fixed quantity of storage locations, a head address queue is maintained in the local memory of the graph data processing device, and the head address queue is used to sequentially store a head address of each memory block according to a creation time sequence. Correspondingly, the storage location determining unit can include: a storage location index determining module, configured to determine a storage location index of the to-be-loaded graph data in the graph data storage space based on the graph data loading identifier of the to-be-loaded graph data, where the storage location index includes a memory block index of a memory block and an offset in the memory block; and a head address acquisition module, configured to obtain a head address of the memory block from the head address queue based on the memory block index; and a storage location determining module, configured to determine the storage location of the to-be-loaded graph data in the graph data storage space according to the obtained head address of the memory block and the offset.

Optionally, in an example of the previous aspect, the graph data storage unit can include: a determining module, configured to determine whether a data size of the to-be-loaded graph data exceeds a storage size of the corresponding storage location in the graph data storage space; a memory space application module, configured to: when the data size of the to-be-loaded graph data exceeds the storage size of the corresponding storage location in the graph data storage space, apply for a memory space for the to-be-loaded graph data from a free memory of the local memory of the graph data processing device; a graph data storage module, configured to: when the data size of the to-be-loaded graph data does not exceed the storage size of the corresponding storage location, store the to-be-loaded graph data at the corresponding storage location in the graph data storage space; or when the data size of the to-be-loaded graph data exceeds the storage size of the corresponding storage location in the graph data storage space, store the to-be-loaded graph data to the applied memory space; and a storage address storage module, configured to: when the data size of the to-be-loaded graph data exceeds the storage size of the corresponding storage location in the graph data storage space, store a space address of the applied memory space at the corresponding storage location in the graph data storage space.

Optionally, in an example of the previous aspect, the graph data storage unit can include: a determining module, configured to determine whether a data type of a data attribute of the to-be-loaded graph data includes a variable type; a memory space application module, configured to: when the data type of the data attribute of the to-be-loaded graph data includes the variable type, apply for a memory space for the to-be-loaded graph data from a free memory of the local memory of the graph data processing device; and a graph data storage module, configured to: when the data type of the data attribute of the to-be-loaded graph data does not include the variable type, store the to-be-loaded graph data at the corresponding storage location in the graph data storage space; or when the data type of the data attribute of the to-be-loaded graph data includes the variable type, store the to-be-loaded graph data to the applied memory space; and a storage address storage module, configured to: when the data type of the data attribute of the to-be-loaded graph data includes the variable type, store a space address of the applied memory space at the corresponding storage location in the graph data storage space.

Optionally, in an example of the previous aspect, a mapping table used to record a mapping relationship between a data identifier of graph data and a graph data loading identifier is maintained in the graph data loading apparatus. Correspondingly, the graph data loading apparatus can further include a mapping relationship recording unit, configured to: after the graph data loading identifier of the to-be-loaded graph data is obtained, record a mapping relationship between the obtained graph data loading identifier and a data identifier of the to-be-loaded graph data into the mapping table.

According to another aspect of the embodiments of this specification, a graph data loading apparatus is provided, and includes at least one processor, a storage coupled to the at least one processor, and a computer program stored in the storage. The at least one processor executes the computer program to implement the previous graph data loading method.

According to another aspect of the embodiments of this specification, a computer-readable storage medium is provided. The computer-readable storage medium stores executable instructions. When the instructions are executed, a processor is enabled to perform the previous graph data loading method.

According to another aspect of the embodiments of this specification, a computer program product is provided, and includes a computer program. The computer program is executed by a processor to implement the previous graph data loading method.

BRIEF DESCRIPTION OF DRAWINGS

The essence and advantages of the content of this specification can be further understood with reference to the following accompanying drawings. In the accompanying drawings, similar components or features can have the same reference numerals.

DESCRIPTION OF EMBODIMENTS

The subject matter described here will be discussed below with reference to example implementations. It should be understood that these implementations are merely discussed to enable a person skilled in the art to better understand and implement the subject matter described in this specification, and are not intended to limit the protection scope, applicability, or examples described in the claims. The functions and arrangements of the elements under discussion can be changed without departing from the protection scope of this specification. Various processes or components can be omitted, replaced, or added in various examples as needed. For example, the described method can be performed in a different order from the described sequence, and steps can be added, omitted, or combined. In addition, features described relative to some examples can be combined in other examples.

As used in this specification, the term "include" and its variant represent open terms, meaning "including but not limited to". The term "based on" means "at least partially based on". The terms "one embodiment" and "an embodiment" mean "at least one embodiment". The term "another embodiment" indicates "at least one other embodiment". The terms "first", "second", etc. can refer to different objects or the same object. The following can include other definitions, whether explicit or implicit. Unless expressly stated in the context, the definition of one term is consistent throughout this specification.

In this specification, the term "graph data loading" refers to loading graph data from an external graph data storage device (for example, a network or an external storage medium) into a local memory of a graph data processing device (for example, a graph calculation engine device) for use by the graph data processing device to perform corresponding graph data processing. For example, the graph calculation engine device performs graph calculation by using loaded graph data.

Figure 1:
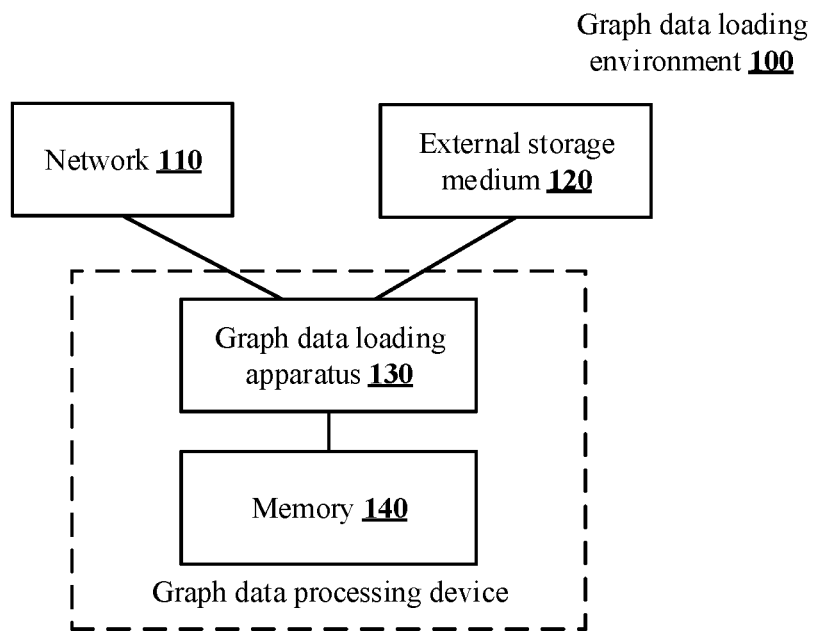
FIG. 1 shows an example architectural diagram of a graph data loading environment according to an embodiment of this specification.

FIG. 1 shows an example architectural diagram of a graph data loading environment 100 according to an embodiment of this specification. As shown in FIG. 1, a graph data loading environment 100 includes a network 110, an external storage medium 120, a graph data loading apparatus 130, and a local memory 140 of a graph data processing device.

Graph data used when the graph data processing device performs graph data processing is stored in the network 110 or the external storage medium 120. The data loading apparatus 130 obtains to-be-loaded graph data from the network 110 or the external storage medium 120, and loads the to-be-loaded graph data into the local memory 140 of the graph data processing device, so the graph data processing device performs subsequent processing. In the example of FIG. 1, the graph data loading apparatus 130 is included in the graph data processing device as a component of the graph data processing device. For example, the graph data loading apparatus 130 can be implemented as a graph data loading thread in the graph data processing device. In another example, the graph data loading apparatus 130 can alternatively be located outside the graph data processing device.

Figure 2:
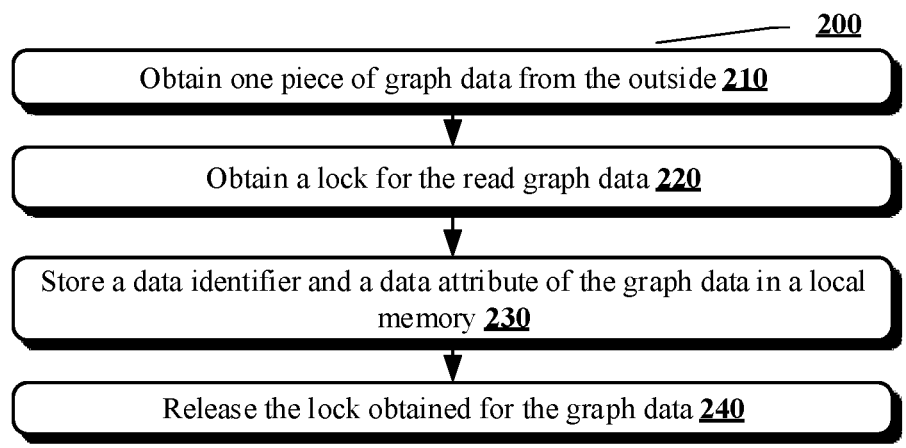
FIG. 2 shows an example flowchart of an existing graph data loading method.

FIG. 2 shows an example flowchart of an existing graph data loading method 200.

As shown in FIG. 2, at 210, the graph data loading apparatus 130 obtains one piece of to-be-loaded graph data from the outside. For example, one piece of to-be-loaded graph data is obtained from the network 110 or the external storage medium 120. The obtained graph data can include a data identifier and a data attribute.

In this specification, for example, the graph data can include vertex data and/or edge data. The vertex data can include, for example, a vertex identifier and a vertex attribute. In an example, the vertex identifier can include a vertex ID and a vertex type. In another example, the vertex identifier can include a vertex ID. The vertex identifier is used to uniquely identify a vertex in the graph data. The edge data can include an edge identifier and an edge attribute. The edge identifier can include a start point ID, an edge type, an edge timestamp, and an end point ID. The vertex identifier, the edge identifier, the vertex attribute, and the edge attribute can be related to a service. For example, in a social network scenario, the vertex ID can be a person's identity card number, a person's number, etc. The vertex type can be a category to which a vertex belongs, for example, a vertex is classified as a user-type vertex. The vertex attribute can include age, education, address, occupation, etc. The edge type is used to indicate a type to which an edge belongs. For example, if a transfer edge is created between vertexes A and B, an edge type of the transfer edge can be "transfer". The edge attribute can include an attribute of an edge formed between vertexes. For example, in the above-mentioned transfer edge, an edge attribute can include "amount", "currency", "operating device", etc. The term "vertex" can also be referred to as a graph node.

220. Obtain, in response to obtaining to-be-loaded graph data, a lock for the to-be-loaded graph data. In an example, a lock can be created in the graph data loading apparatus in advance, so as to be used by the graph data loading apparatus to perform graph data loading. In response to obtaining to-be-loaded graph data, a lock for the to-be-loaded graph data is obtained from the graph data loading apparatus. In another example, the graph data loading apparatus can be implemented by using a graph data loading thread of the graph data processing device. In this case, a lock can be created in advance in the local memory of the graph data processing device, so multiple concurrent graph data loading threads in the graph data processing device contend for use to load the graph data. In response to obtaining to-be-loaded graph data, the graph data loading thread performs graph data loading by obtaining a lock for the to-be-loaded graph data from the local memory of the graph data processing device. By using a lock mechanism, multiple concurrent graph data loading threads need to contend for a use right of the lock to execute corresponding graph data loading, so only one thread can access a critical zone code at a specific time point in a multi-core multi-thread environment, thereby ensuring consistency of operation data in a critical zone.

230. After the lock is obtained, in a locked state, store a data identifier and a data attribute of the graph data in the local memory 140 of the graph data processing device.

240. In response to loading the data identifier and the data attribute of the graph data into the local memory 14 of the graph data processing device, release the lock obtained for the graph data, thereby completing a graph data loading process.

According to the previous graph data loading manner, when the data identifier and the data attribute of the graph data are stored in the memory of the graph data processing device, the obtained lock needs to be held. Because it takes a relatively long time to store the data identifier and the data attribute, a lock holding time of a single piece of graph data is relatively long. In the case of large-scale graph data, graph data loading usually needs to be performed concurrently. During concurrent loading, if a lock holding time of a single piece of graph data is relatively long, another piece of graph data is prone to be loaded for a relatively long time due to lock contention, and consequently, concurrent loading efficiency of graph data is affected.

In view of this, embodiments of this specification provide a graph data loading method and apparatus. In the graph data loading method, a graph data loading identifier of to-be-loaded graph data is maintained in a graph data loading apparatus, and after new to-be-loaded graph data is obtained, in a locked case, the graph data loading identifier of the previous to-be-loaded graph data is incremented to obtain a graph data loading identifier of the current to-be-loaded graph data. Then, a storage location of the current to-be-loaded graph data in a graph data storage space of the local memory is determined based on the obtained graph data loading identifier, and in a case of lock release, the current to-be-loaded graph data is stored in the determined storage location in the graph data storage space. In the graph data loading method, a graph data storage process is performed in a case of lock release, so a lock holding time in a graph data loading process of a single piece of graph data can be reduced, and concurrent efficiency of graph data loading is improved.

The following describes a graph data loading method, a graph data loading apparatus, a graph data obtaining method, and a graph data obtaining apparatus according to embodiments of this specification with reference to the accompanying drawings.

Figures 3, 4:
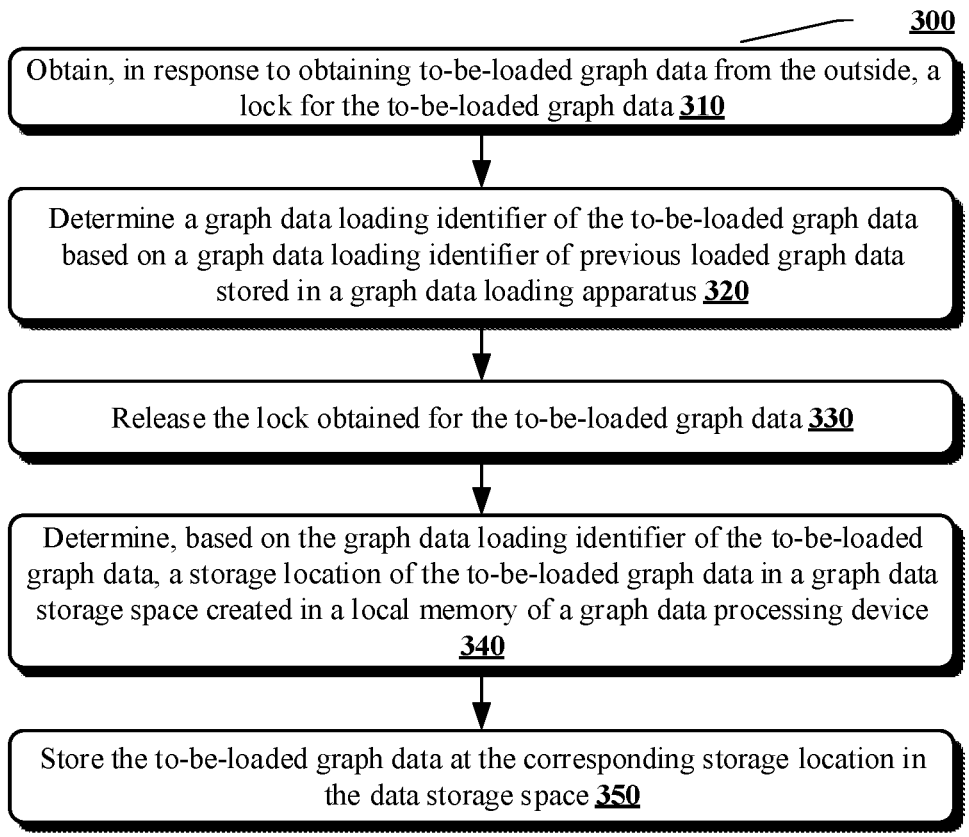
FIG. 3 shows an example flowchart of a graph data loading method according to an embodiment of this specification.
FIG. 4 shows an example schematic diagram of a mapping table for recording a mapping relationship between a data identifier of graph data and a graph data loading identifier according to an embodiment of this specification.

FIG. 3 shows an example flowchart of a graph data loading method 300 according to an embodiment of this specification. The graph data loading method 300 is performed by a graph data loading apparatus.

As shown in FIG. 3, at 310, in response to obtaining current to-be-loaded graph data from the outside, the graph data loading apparatus obtains a lock for the obtained to-be-loaded graph data. The current to-be-loaded graph data can be graph data from a network or an external storage medium.

In an example, a lock can be created in the graph data loading apparatus in advance, so as to be used by the graph data loading apparatus to perform graph data loading. In response to obtaining to-be-loaded graph data, a lock for the to-be-loaded graph data is obtained from the graph data loading apparatus. In another example, the graph data loading apparatus can be implemented, for example, as a graph data loading thread of a graph data processing device. In this case, a lock can be created in advance in a local memory of the graph data processing device, so multiple graph data loading threads in the graph data processing device are concurrently used to load the graph data. In response to obtaining to-be-loaded graph data, the graph data loading thread performs graph data loading by obtaining a lock for the to-be-loaded graph data from the local memory of the graph data processing device.

320. Determine a graph data loading identifier of the current to-be-loaded graph data based on a graph data loading identifier of previous loaded graph data stored in the graph data loading apparatus.

In an example, the graph data loading identifier can be represented by using a loading sequence number of the graph data. In this case, a graph data loading identifier of the current to-be-loaded graph data is obtained by incrementing the graph data loading identifier of the previous to-be-loaded graph data by 1. For example, assume that graph data A is the first loaded graph data, a graph data loading identifier of the graph data A is 1. If graph data B is the second loaded graph data, a graph data loading identifier of the graph data B is 2. Assume that a graph data loading identifier of graph data M is K, a graph data loading identifier of graph data loaded immediately after the graph data M is K+1.

In another example, the graph data loading identifier of the to-be-loaded graph data can be represented by a data size (data length) of the graph data. In this case, a graph data loading identifier of the first to-be-loaded graph data can be represented as a data size of the graph data. For example, assume that the data size of the graph data is 32 k, the graph data loading identifier of the graph data can be 32. A graph data loading identifier of the second loading graph data can use a sum of a graph data size of the second loading graph data and the graph data loading identifier of the first loading graph data as the graph data loading identifier of the second loading graph data. For example, assume that a data size of the second loading graph data is also 32 k, the graph data loading identifier of the second loading graph data is 64. A graph data loading identifier of subsequent to-be-loaded graph data is determined by analogy.

The determined graph data loading identifier can be stored in the graph data loading apparatus. For example, in an example, the current graph data loading identifier can be stored only at a specific location in the local memory of the graph data loading apparatus, that is, a graph data loading identifier obtained each time of graph data loading processing is stored by using a specific field in the local memory of the graph data loading apparatus, for use in a subsequent graph data loading process. In another example, a graph data loading identifier queue can be maintained in the graph data loading apparatus. A current graph data loading identifier obtained in each graph data loading process is sequentially stored in the graph data loading identifier queue, that is, the current graph data loading identifier obtained each time is stored at the tail of the graph data loading identifier queue. In another example, a mapping table used to record a mapping relationship between a data identifier of graph data and a graph data loading identifier can be maintained in the graph data loading apparatus. Correspondingly, after the graph data loading identifier of the current to-be-loaded graph data is obtained, a mapping relationship between the obtained graph data loading identifier and a data identifier of the current to-be-loaded graph data is recorded into the mapping table. FIG. 4 shows an example schematic diagram of a mapping table for recording a mapping relationship between a data identifier of graph data and a graph data loading identifier according to an embodiment of this specification.

In some embodiments, the graph data loading apparatus is applied to the graph data processing device. For example, the graph data loading apparatus is implemented as a graph data loading thread in the graph data processing device. In this case, the graph data loading identifier can be stored in the graph data processing device. For example, the graph data loading identifier can be maintained at a specific storage location in the local memory of the graph data processing device. Or the graph data loading identifier queue is maintained in the local memory of the graph data processing device. A current graph data loading identifier obtained in each graph data loading process is sequentially stored in the graph data loading identifier queue. Or the mapping table used to record the mapping relationship between a data identifier of graph data and a graph data loading identifier is maintained in the local memory of the graph data processing device. Correspondingly, after the graph data loading identifier of the current to-be-loaded graph data is obtained, a mapping relationship between the obtained graph data loading identifier and a data identifier of the current to-be-loaded graph data is recorded into the mapping table.

330. After the graph data loading identifier of the current to-be-loaded graph data is determined as described above, release the lock obtained for the current to-be-loaded graph data.

340. Determine, based on the graph data loading identifier of the current to-be-loaded graph data, a storage location of the current to-be-loaded graph data in a graph data storage space created in the local memory of the graph data processing device.

In this specification, before graph data is loaded, a graph data storage space can be created in the local memory of the graph data processing device. The created graph data storage space can include multiple memory blocks used to store loaded graph data. For example, a memory block can be created from a free memory space of the local memory of the graph data processing device. One or more memory blocks can be created at a time, and each memory block created can have a fixed quantity (P) of storage locations. In addition, the local memory of the graph data processing device further maintains a head address queue, and head addresses of created memory blocks are sequentially stored in the head address queue according to a creation time sequence. When multiple memory blocks are created at the same time, a creation time sequence of the multiple memory blocks can be randomly determined.

Figure 5A:
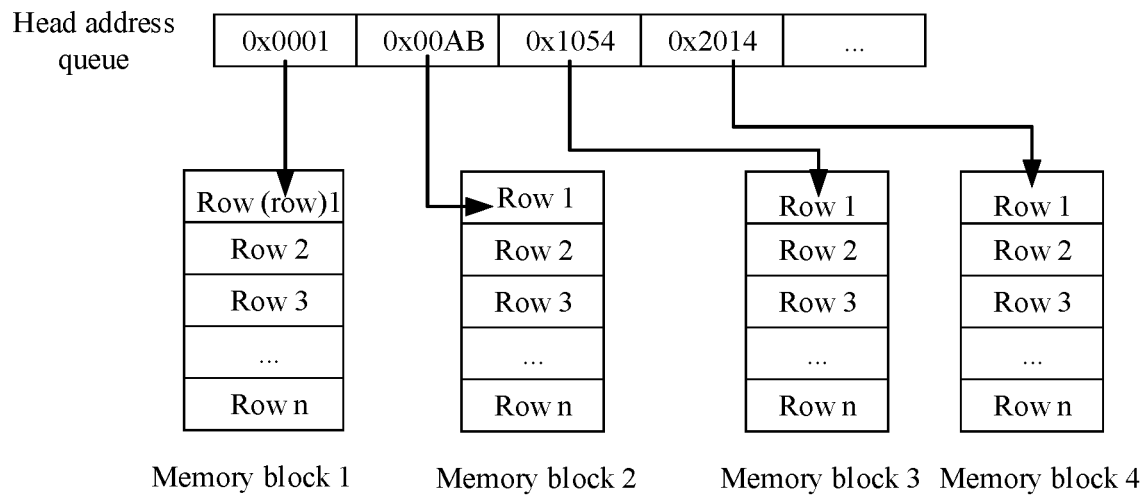
FIG. 5A and FIG. 5B show example schematic diagrams of a graph data storage space in a local memory of a graph data processing device according to an embodiment of this specification.
Figure 5B:
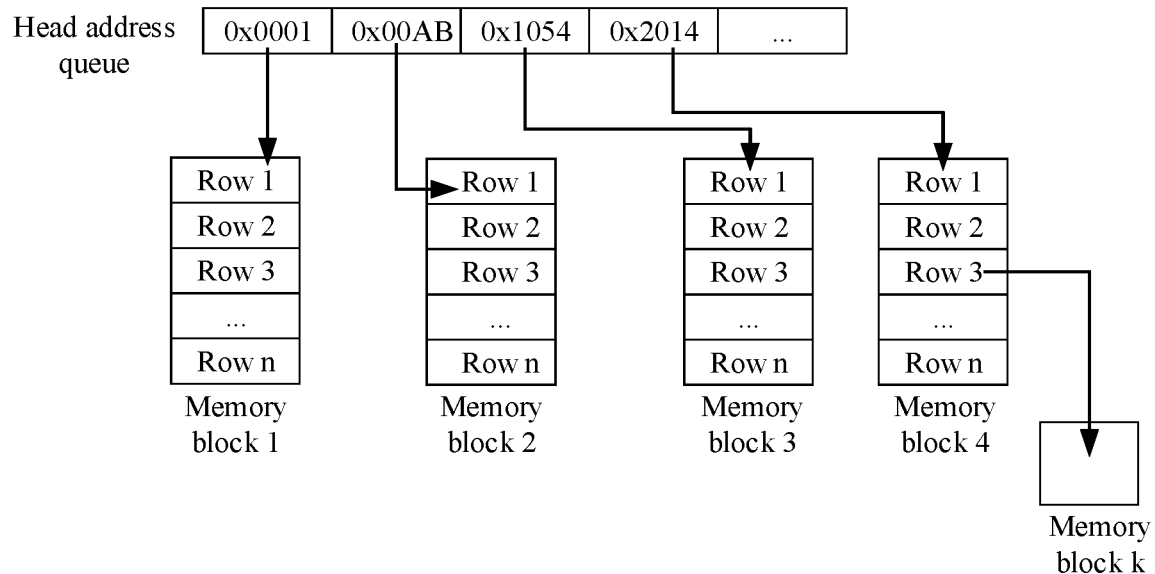

FIG. 5A and FIG. 5B show example schematic diagrams of a graph data storage space in a local memory of a graph data processing device according to an embodiment of this specification. In the example in FIG. 5A, a storage size of each storage location is sufficient to store to-be-loaded graph data, so each piece of to-be-loaded graph data is stored at each corresponding storage location of the memory block. In the example in FIG. 5B, data sizes of some to-be-loaded graph data exceed storage sizes of corresponding storage locations. In this case, a proper free memory space needs to be newly applied for the to-be-loaded graph data from the local memory of the graph data processing device, the to-be-loaded graph data is stored in the newly applied memory space, and a space address of the newly applied memory space is stored at the determined storage location in the graph data storage space. In FIG. 5A and FIG. 5B, a head address of each memory block stored in a head address queue points to the first storage location of a corresponding memory block.

Figure 6:
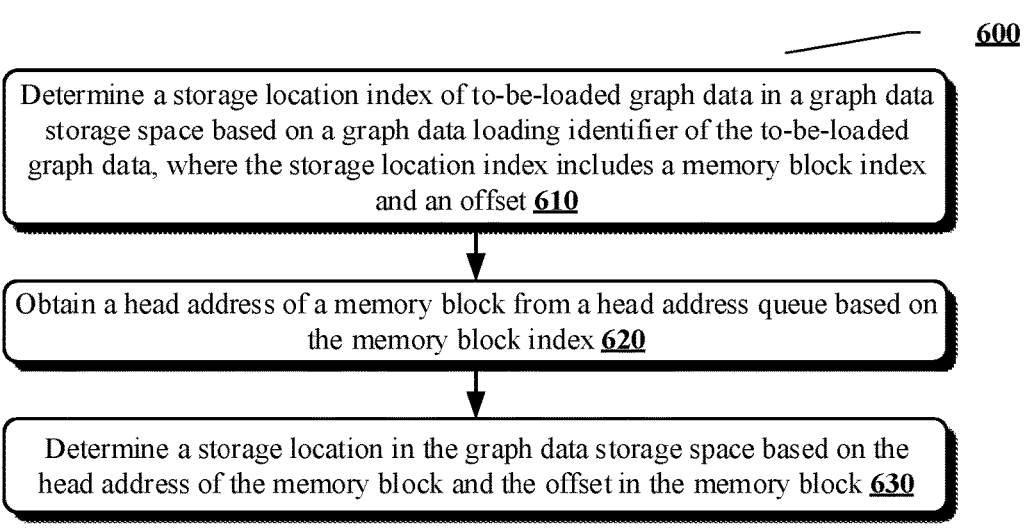
FIG. 6 shows an example flowchart of a process for determining a storage location of to-be-loaded graph data in a graph data storage space according to an embodiment of this specification.

FIG. 6 shows an example flowchart of a process 600 for determining a storage location of to-be-loaded graph data in a graph data storage space according to an embodiment of this specification.

As shown in FIG. 6, at 610, determine, based on a graph data loading identifier of current to-be-loaded graph data, a storage location index of the current to-be-loaded graph data in a graph data storage space created in a local memory of a graph data processing device, where the storage location index includes a memory block index of a memory block and an offset in the memory block.

In an example, when the graph data loading identifier is represented by using a loading sequence number of graph data, modulo processing can be performed on the graph data loading identifier by using a quantity (P) of storage locations in a memory block as a modulus. Then, an integer result obtained by performing modulo processing is used as the memory block index of the to-be-loaded graph data in the graph data storage space, and a remainder result is used as the offset in the memory block. Here, the offset can be a quantity of offset positions relative to a storage location corresponding to a head address.

In another example, when the graph data load identifier is represented by using a data size of the graph data, modulo processing can be performed on the graph data load identifier by using a storage size (capacity) in a memory block as a modulus. Then, an integer result obtained by modulo processing is used as the memory block index of the to-be-loaded graph data in the graph data storage space, and an offset address in the memory block is determined based on a remainder result and used as an offset in the memory block. Here, the offset address refers to an offset of a start address of the storage location relative to the head address.

620. Obtain, based on the memory block index, the head address of the memory block from a head address queue maintained in the local memory of the graph data processing device. 630. Determine the storage location of the to-beloaded graph data in the graph data storage space according to the obtained head address of the memory block and the offset. For example, a head address and an offset address corresponding to each offset can be used to determine a corresponding storage location.

Returning to FIG. 3, after the storage location of the current to-be-loaded graph data in the graph data storage space is determined, the to-be-loaded graph data is stored at the corresponding storage location in the graph data storage space at 350. In an example, a data identifier and a data attribute of the current to-be-loaded graph data can be stored at the corresponding storage location in the graph data storage space. In another example, only a data attribute of the current to-be-loaded graph data can be stored at the corresponding storage location in the graph data storage space.

Figure 7:
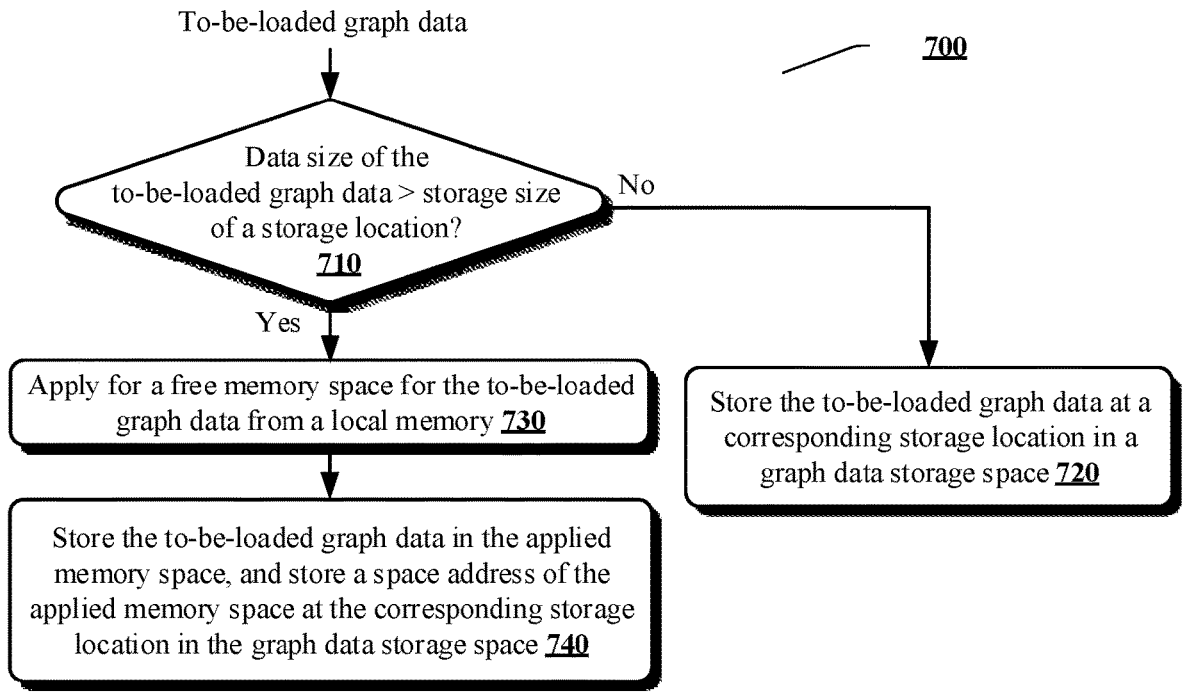
FIG. 7 shows an example flowchart of a data storage process for storing to-be-loaded graph data at a corresponding storage location in a graph data storage space according to an embodiment of this specification.

FIG. 7 shows an example flowchart of a data storage process 700 for storing to-be-loaded graph data at a corresponding storage location in a graph data storage space according to an embodiment of this specification.

As shown in FIG. 7, at 710, determine whether a data size of to-be-loaded graph data exceeds a storage size of a corresponding storage location in a graph data storage space.

When the data size of the to-be-loaded graph data does not exceed the storage size of the corresponding storage location in the graph data storage space, at 720, store the to-be-loaded graph data at the corresponding storage location in the graph data storage space.

When the data size of the to-be-loaded graph data exceeds the storage size of the corresponding storage location in the graph data storage space, at 730, apply for a memory space for the to-be-loaded graph data from a free memory of the local memory of the graph data processing device.

After the memory space is applied for, at 740, store the to-be-loaded graph data in the applied memory space, and store a space address (a head address of the memory space) of the applied memory space at a corresponding storage location in the graph data storage space.

Figure 8:
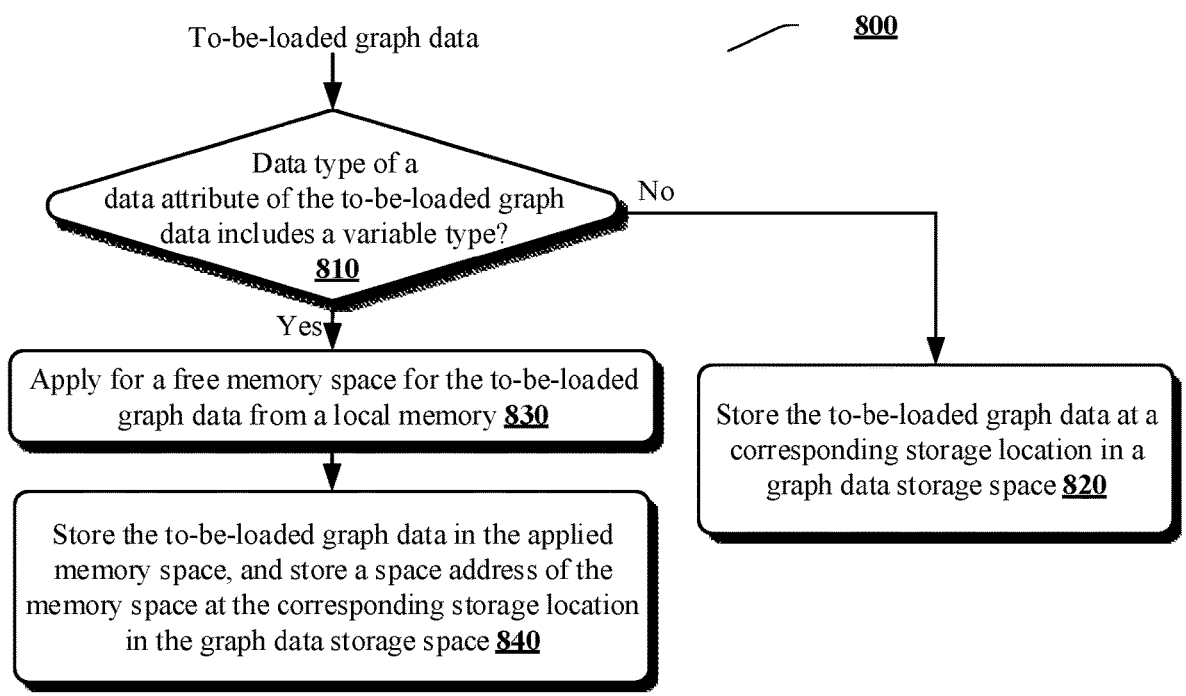
FIG. 8 shows another example flowchart of a data storage process for storing to-be-loaded graph data at a corresponding storage location in a graph data storage space according to an embodiment of this specification.

FIG. 8 shows another example flowchart of a data storage process 800 for storing to-be-loaded graph data at a corresponding storage location in a graph data storage space according to an embodiment of this specification.

As shown in FIG. 8, at 810, determine whether a data type of a data attribute of to-be-loaded graph data includes a variable type. Here, the variable type is that a data type is variable, that is, a data length occupied by data of the data type is variable.

When the data type of the data attribute of the to-be-loaded graph data does not include the variable type, at 820, store the to-be-loaded graph data at a corresponding storage location in a graph data storage space. Here, when the to-be-loaded graph data includes multiple data attributes, excluding the variable type means that all data attributes do not include the variable type. In this case, because the data attribute of the to-be-loaded graph data has a fixed data type, a data size of a storage location can be determined in advance based on the data type of the data attribute of the to-be-loaded graph data, so a storage size of the storage location is sufficient to store the to-be-loaded graph data.

When the data type of the data attribute of the to-be-loaded graph data includes the variable type, at 830, apply for a memory space for the to-be-loaded graph data from a free memory of a local memory of a graph data storage device.

After the memory space is applied for, at 840, store the to-be-loaded graph data in the applied memory space, and store a space address (a head address of the memory space) of the applied memory space at a corresponding storage location in the graph data storage space.

It is worthwhile to note that in the example of FIG. 3, the storage location determining process is shown to be performed after the lock release process. In another embodiment, the lock release process can be performed after the storage location determining process is completed.

The previous describes the graph data loading method according to an embodiment of this specification with reference to FIG. 3 to FIG. 8. By using the graph data loading method, a graph data storage process is performed when a lock is released, so a lock holding time in the graph data loading process can be reduced, lock contention in a concurrent loading process is reduced, and concurrent efficiency of graph data loading is improved.

According to the graph data loading method, multiple memory blocks used to store graph data are created in a local memory of a graph data processing apparatus, each memory block has a fixed quantity of storage locations, and a head address queue is maintained in the local memory of the graph data processing apparatus. A storage location index can be easily determined based on the graph data loading identifier, and a storage location in the graph data storage space is obtained based on the storage location index, thereby reducing complexity of determining the storage location.

After the graph data is loaded to the graph data processing device, when graph data processing is performed, corresponding graph data can be obtained from the local memory of the graph data processing device to perform graph data processing.

Figure 9:
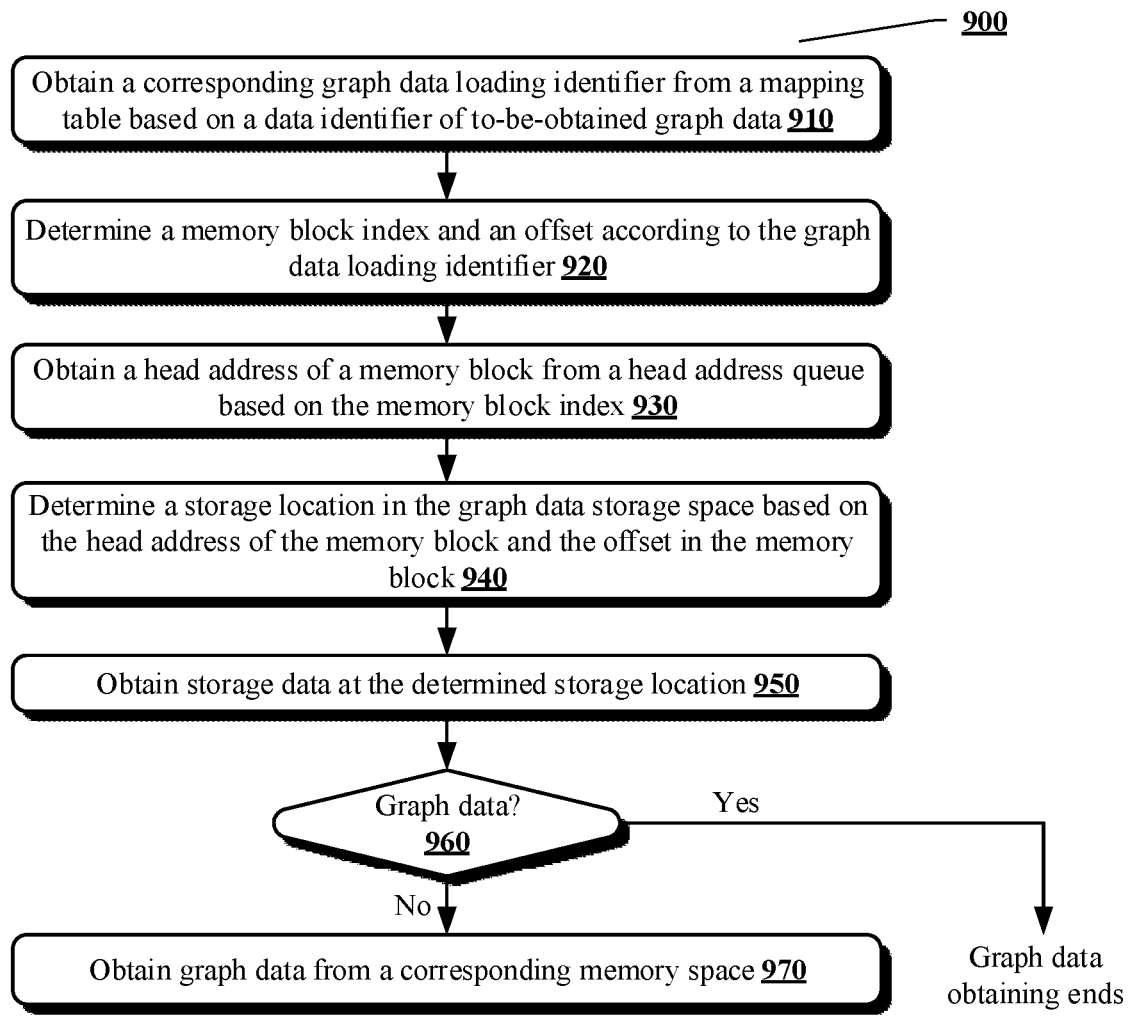
FIG. 9 shows an example flowchart of a graph data obtaining method according to an embodiment of this specification.

FIG. 9 shows an example flowchart of a graph data obtaining method 900 according to an embodiment of this specification. The graph data obtaining method can be performed by a graph data obtaining apparatus, and the mapping table and the head address queue are also maintained in the graph data obtaining apparatus. When the graph data obtaining apparatus is applied to a graph data processing device, the mapping table and the head address queue can be maintained by the graph data processing device.

As shown in FIG. 9, at 910, in response to receiving a graph data obtaining request, obtain a corresponding graph data loading identifier from a mapping table based on a data identifier of to-be-obtained graph data in the graph data obtaining request.

920. Determine a storage location index of the graph data in a graph data storage space of the graph data processing device according to the graph data loading identifier, where the storage location index includes a memory index of a memory block in which the graph data is located and an offset in the memory block.

930. Obtain a head address of a corresponding memory block from the head address queue based on the memory index. 940. Determine a storage location of the graph data in the graph data storage space based on the obtained head address of the memory block and the obtained offset in the memory block.

950. Obtain corresponding storage content from the graph data storage space of the graph data processing device based on the determined storage location. 960. Determine whether the obtained storage content is graph data, and if the obtained storage content is a book, complete a graph data obtaining process. If the obtained storage content is a storage address of a memory space, at 970, obtain graph data from a memory space to which the storage address points, so as to complete a graph data obtaining process.

Figure 10:
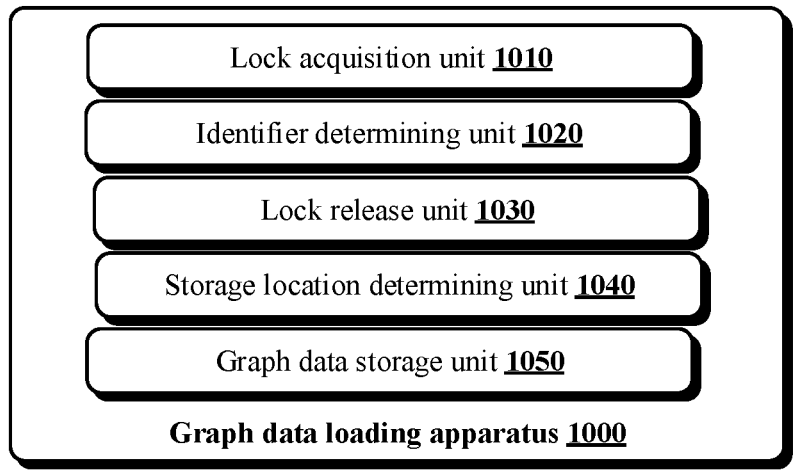
FIG. 10 shows an example block diagram of a graph data loading apparatus according to an embodiment of this specification.

FIG. 10 shows an example block diagram of a graph data loading apparatus 1000 according to an embodiment of this specification. As shown in FIG. 10, the graph data loading apparatus 1000 can include a lock acquisition unit 1010, an identifier determining unit 1020, a lock release unit 1030, a storage location determining unit 1040, and a graph data storage unit 1050.

The lock acquisition unit 1010 is configured to obtain, in response to obtaining to-be-loaded graph data from the outside, a lock for the to-be-loaded graph data. For operations of the lock acquisition unit 1010, references can be made to the operations as previously described in 310 with reference to FIG. 3. Optionally, the graph data loading apparatus 1000 can further include a graph data acquisition unit. The graph data acquisition unit is configured to obtain the to-be-loaded graph data from the outside.

The identifier determining unit 1020 is configured to determine a graph data loading identifier of the to-be-loaded graph data based on a graph data loading identifier of previous loaded graph data stored in a graph data loading apparatus. For operations of the identifier determining unit 1020, references can be made to the operations as previously described in 320 with reference to FIG. 3.

The lock release unit 1030 is configured to release the lock obtained for the to-be-loaded graph data. For operations of the lock release unit 1030, references can be made to the operations as previously described in 330 with reference to FIG. 3.

The storage location determining unit 1040 is configured to determine, based on the graph data loading identifier of the to-be-loaded graph data, a storage location of the to-be-loaded graph data in a graph data storage space created in a local memory of a graph data processing device. For operations of the storage location determining unit 1040, references can be made to the operations as previously described in 340 with reference to FIG. 3 and the operations as previously described with reference to FIG. 6.

The graph data storage unit 1050 is configured to: after lock release is completed, store the to-be-loaded graph data at a corresponding storage location in the graph data storage space. For operations of the graph data storage unit 1050, references can be made to the operations as previously described in 350 with reference to FIG. 3 and the operations as previously described with reference to FIG. 7 or FIG. 8.

In some embodiments, the graph data storage unit 1050 can load a data identifier and a data attribute of the to-be-loaded graph data at the corresponding storage location in the graph data storage space. In some embodiments, the graph data storage unit 1050 can load a data attribute of the to-be-loaded graph data at the corresponding storage location in the graph data storage space.

Figure 11:
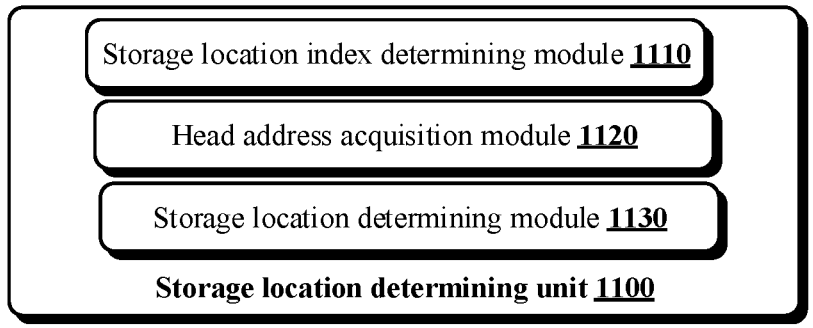
FIG. 11 shows an example block diagram of a storage location determining unit according to an embodiment of this specification.

FIG. 11 shows an example block diagram of a storage location determining unit 1100 according to an embodiment of this specification. In this embodiment, a graph data storage space can include multiple memory blocks used to store graph data, and each memory block has a fixed quantity of storage locations. In addition, a local memory of a graph data processing device further maintains a head address queue, and head addresses of created memory blocks are sequentially stored in the head address queue according to a creation time sequence.

As shown in FIG. 11, the storage location determining unit 1100 includes a storage location index determining module 1110, a head address acquisition module 1120, and a storage location determining module 1130.

The storage location index determining module 1110 is configured to determine, based on a graph data loading identifier of to-be-loaded graph data, a storage location index of the to-be-loaded graph data in a graph data storage space created in the local memory of the graph data processing device, where the determined storage location index includes a memory block index of a memory block and an offset in the memory block. For operations of the storage location index determining module 1110, references can be made to the operations as previously described with reference to 610 in FIG. 6.

The head address acquisition module 1120 is configured to obtain, based on the memory block index, a head address of a memory block in which the graph data is located from the head address queue. For operations of the head address acquisition module 1120, references can be made to the operations as previously described in 620 with reference to FIG. 6.

The storage location determining module 1130 is configured to determine the storage location of the to-be-loaded graph data in the graph data storage space according to the obtained head address of the memory block and the offset. For operations of the storage location determining module 1130, references can be made to the operations as previously described with reference to 630 in FIG. 6.

Figure 12:
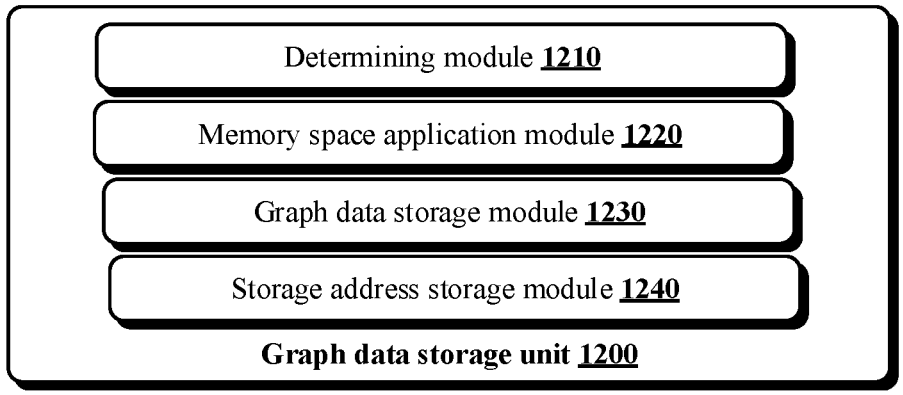
FIG. 12 shows an example block diagram of a graph data storage unit according to an embodiment of this specification.

FIG. 12 shows an example block diagram of a graph data storage unit 1200 according to an embodiment of this specification. As shown in FIG. 12, the graph data storage unit 1200 includes a determining module 1210, a memory space application module 1220, a graph data storage module 1230, and a storage address storage module 1240.

The determining module 1210 is configured to determine whether a data size of to-be-loaded graph data exceeds a storage size of a corresponding storage location in a graph data storage space. For operations of the determining module 1210, references can be made to the operations as previously described in 710 with reference to FIG. 7.

The memory space application module 1220 is configured to: when the data size of the to-be-loaded graph data exceeds the storage size of the corresponding storage location in the graph data storage space, apply for a memory space for the to-be-loaded graph data from a free memory of the local memory of the graph data processing device. For operations of the memory space application module 1220, references can be made to the operations as previously described in 730 with reference to FIG. 7.

The graph data storage module 1230 is configured to: when the data size of the to-be-loaded graph data does not exceed the storage size of the corresponding storage location in the graph data storage space, store the to-be-loaded graph data at the corresponding storage location in the graph data storage space; and when the data size of the to-be-loaded graph data exceeds the storage size of the corresponding storage location in the graph data storage space, store the to-be-loaded graph data to the applied memory space. For operations of the graph data storage module 1230, references can be made to the operations as previously described in 720 or 740 with reference to FIG. 7.

The storage address storage module 1240 is configured to: when the data size of the to-be-loaded graph data exceeds the storage size of the corresponding storage location in the graph data storage space, store a space address of the applied memory space at the corresponding storage location in the graph data storage space. For operations of the storage address storage module 1240, references can be made to the operations as previously described in 740 with reference to FIG. 7.

Figure 13:
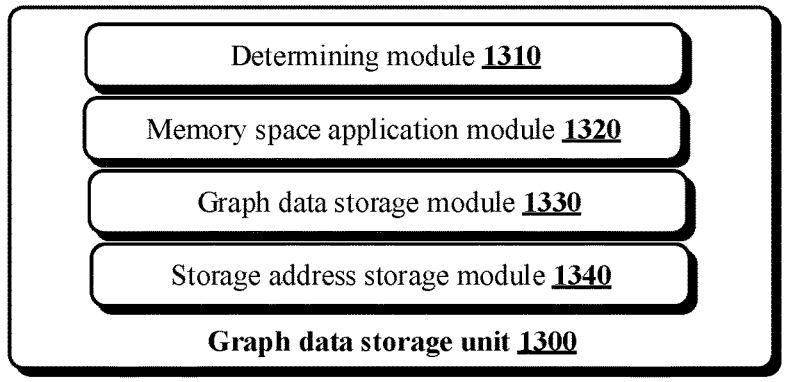
FIG. 13 shows another example block diagram of a graph data storage unit according to an embodiment of this specification.

FIG. 13 shows another example block diagram of a graph data storage unit 1300 according to an embodiment of this specification. As shown in FIG. 13, the graph data storage unit 1300 includes a determining module 1310, a memory space application module 1320, a graph data storage module 1330, and a storage address storage module 1340.

The determining module 1310 is configured to determine whether a data type of a data attribute of to-be-loaded graph data includes a variable type. For operations of the determining module 1310, references can be made to the operations as previously described in 810 with reference to FIG. 8.

The memory space application module 1320 is configured to: when the data type of the data attribute of the to-be-loaded graph data includes the variable type, apply for a memory space for the to-be-loaded graph data from a free memory of a local memory of a graph data processing device. For operations of the memory space application module 1320, references can be made to the operations as previously described in 830 with reference to FIG. 8.

The graph data storage module 1330 is configured to: when the data type of the data attribute of the to-be-loaded graph data does not include the variable type, store the to-be-loaded graph data at the corresponding storage location in the graph data storage space; or when the data type of the data attribute of the to-be-loaded graph data includes the variable type, store the to-be-loaded graph data to the applied memory space. For operations of the graph data storage module 1330, references can be made to the operations as previously described in 820 or 840 with reference to FIG. 8.

The storage address storage module 1340 is configured to: when the data type of the data attribute of the to-be-loaded graph data includes the variable type, store a space address of the applied memory space at the corresponding storage location in the graph data storage space. For operations of the storage address storage module 1340, references can be made to the operations as previously described in 840 with reference to FIG. 8.

In addition, the graph data loading apparatus can further maintain a mapping table used to record a mapping relationship between a data identifier of graph data and a graph data loading identifier. Correspondingly, the graph data loading apparatus can further include a mapping relationship recording unit. After the graph data loading identifier of the to-be-loaded graph data is obtained, the mapping relationship recording unit records the obtained mapping relationship between a graph data loading identifier and a data identifier of to-be-loaded graph data into the mapping table.

Figure 14:
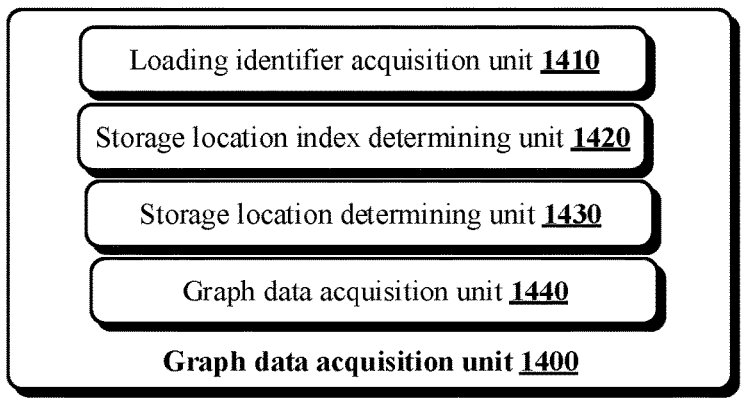
FIG. 14 shows an example block diagram of a graph data obtaining apparatus according to an embodiment of this specification.

FIG. 14 shows an example block diagram of a graph data obtaining apparatus 1400 according to an embodiment of this specification. As shown in FIG. 14, the graph data obtaining apparatus 1400 includes a loading identifier acquisition unit 1410, a storage location index determining unit 1420, a storage location determining unit 1430, and a graph data acquisition unit 1440.

The loading identifier acquisition unit 1410 is configured to: in response to receiving a graph data obtaining request, obtain a corresponding graph data loading identifier from a mapping table based on a data identifier of to-be-obtained graph data in the graph data obtaining request. For operations of the loading identifier acquisition unit 1410, references can be made to the operations as previously described in 910 with reference to FIG. 9.

The storage location index determining unit 1420 is configured to determine a storage location index of the graph data in a graph data storage space of the graph data processing device according to the graph data loading identifier, where the storage location index includes a memory index of a memory block in which the graph data is located and an offset in the memory block. For operations of the storage location index determining unit 1420, references can be made to the operations as previously described with reference to 920 in FIG. 9.

The storage location determining unit 1430 is configured to: obtain a head address of a corresponding memory block from a head address queue based on the memory index, and determine a storage location of the graph data in the graph data storage space based on the obtained head address of the memory block and the obtained offset in the memory block. For operations of the storage location determining unit 1430, references can be made to the operations as previously described with reference to 930 and 940 in FIG. 9.

The graph data acquisition unit 1440 is configured to obtain corresponding graph data from the graph data storage space of the graph data processing device based on the determined storage location, so as to complete graph data obtaining. For operations of the graph data acquisition unit 1440, references can be made to the operations as previously described in 950-970 with reference to FIG. 9.

Referring to FIG. 1 to FIG. 14, the previous describes the graph data loading method, the graph data loading apparatus, the graph data obtaining method, and the graph data obtaining apparatus according to embodiments of this specification. The previous graph data loading apparatus and graph data obtaining apparatus can be implemented by using hardware, or can be implemented by using software or a combination of hardware and software.

Figure 15:
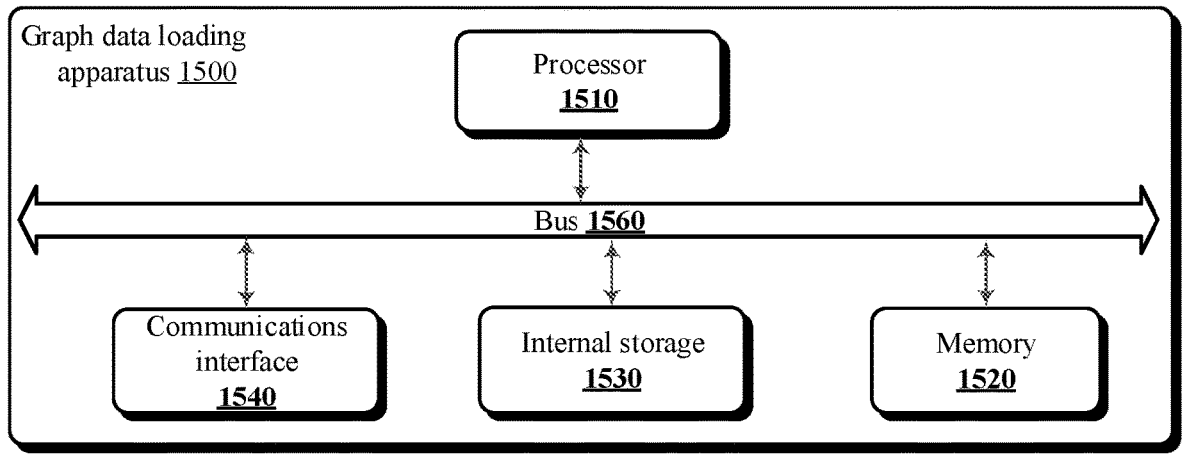
FIG. 15 shows an example schematic diagram of a graph data loading apparatus implemented based on a computer system according to an embodiment of this specification.

FIG. 15 shows a schematic diagram of a graph data loading apparatus 1500 implemented based on a computer system according to an embodiment of this specification. As shown in FIG. 15, the graph data loading apparatus 1500 can include at least one processor 1510, a memory (for example, a non-volatile memory) 1520, an internal storage 1530, and a communication interface 1540, and the at least one processor 1510, the memory 1520, the internal storage 1530, and the communication interface 1540 are connected together by using a bus 1560. The at least one processor 1510 executes at least one computer-readable instruction (namely, the previous element implemented in a software form) stored or encoded in the storage.

In an embodiment, computer executable instructions are stored in the memory, and when the instructions are executed, the at least one processor 1510 is enabled to: obtain, in response to obtaining to-be-loaded graph data from the outside, a lock for the to-be-loaded graph data; determine a graph data loading identifier of the to-be-loaded graph data based on a graph data loading identifier of previous loaded graph data stored in a graph data loading apparatus; release the lock obtained for the to-be-loaded graph data; and after lock release is completed, store the to-be-loaded graph data at a corresponding storage location in a graph data storage space created in a local memory of a graph data processing device, where the corresponding storage location is determined based on the graph data loading identifier of the to-be-loaded graph data.

It should be understood that, when the computer executable instructions stored in the memory are executed, the at least one processor 1510 performs the previous operations and functions described with reference to FIG. 3 to FIG. 8 and FIG. 10 to FIG. 13 in the embodiments of this specification.

Figure 16:
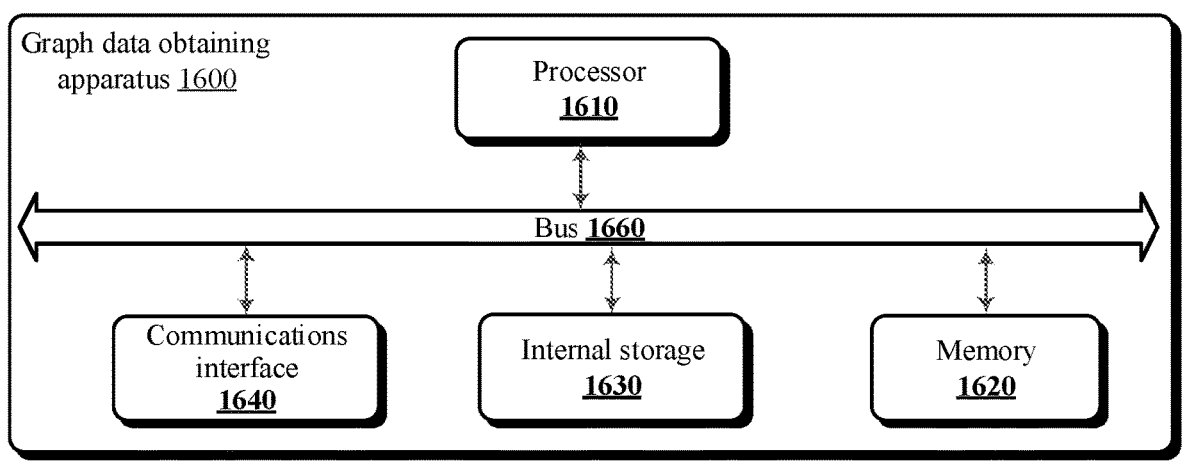
FIG. 16 shows an example schematic diagram of a graph data obtaining apparatus implemented based on a computer system according to an embodiment of this specification.

FIG. 16 shows a schematic diagram of a graph data obtaining apparatus 1600 implemented based on a computer system according to an embodiment of this specification. As shown in FIG. 16, the graph data obtaining apparatus 1600 can include at least one processor 1610, a memory (for example, a non-volatile memory) 1620, an internal storage 1630, and a communication interface 1640, and the at least one processor 1610, the memory 1620, the internal storage 1630, and the communication interface 1640 are connected together by using a bus 1660. The at least one processor 1610 executes at least one computer-readable instruction (namely, the previous element implemented in a software form) stored or encoded in the storage.

In an embodiment, computer executable instructions are stored in the memory, and when the instructions are executed, the at least one processor 1610 is enabled to: in response to receiving a graph data obtaining request, obtain a corresponding graph data loading identifier from a mapping table based on a data identifier of to-be-obtained graph data in the graph data obtaining request; determine a storage location index of the graph data in a graph data storage space of the graph data processing device according to the graph data loading identifier, where the storage location index includes a memory index of a memory block in which the graph data is located and an offset in the memory block; obtain a head address of a corresponding memory block from a head address queue based on the memory index, and determine a storage location of the graph data in the graph data storage space based on the obtained head address of the memory block and the obtained offset in the memory block; and obtain corresponding graph data from the graph data storage space of the graph data processing device based on the determined storage location.

It should be understood that, when the computer executable instructions stored in the memory are executed, the at least one processor 1610 performs the previous operations and functions described with reference to FIG. 9 and FIG. 14 in the embodiments of this specification.

According to an embodiment, a program product such as a machine-readable medium (for example, a non-temporary machine-readable medium) is provided. The machine readable medium can have instructions (that is, the previous elements implemented in software form). When the instructions are executed by a machine, the machine performs the previous operations and functions described with reference to FIG. 1 to FIG. 14 in the embodiments of this specification. Specifically, a system or device equipped with a readable storage medium can be provided, and software program code for implementing a function of any one of the previous embodiments is stored in the readable storage medium, so a computer or a processor of the system or device reads and executes instructions stored in the readable storage medium.

In this case, the program code read from the readable medium can implement the functions in any one of some embodiments described above, and therefore the machine-readable code and the readable storage medium storing the machine-readable code form a part of this specification.

Embodiments of the readable storage medium include a floppy disk, a hard disk, a magneto-optical disc, an optical disc (for example, a CD-ROM, a CD-R, a CD-RW, a DVD-ROM, a DVD-RAM, a DVD-RW, and a DVD-RW), a magnetic tape, a nonvolatile storage card, and a ROM. Or program code can be downloaded from a server computer or cloud through a communication network.

According to an embodiment, a computer program product is provided. The computer program product includes a computer program. When the computer program is executed by a processor, the processor is enabled to perform the operations and functions described above with reference to FIG. 1 to FIG. 14 in the embodiments of this specification.

A person skilled in the art should understand that various variations and modifications to the embodiments disclosed above can be made without departing from the essence of this specification. Therefore, the protection scope of the present disclosure shall be limited by the appended claims.

It is worthwhile to note that not all steps and units in the previous processes and system structure diagrams are required. Some steps or units can be ignored based on actual needs. An execution sequence of each step is not fixed, and can be determined based on needs. The apparatus structure described in the above-mentioned embodiments can be a physical structure, or can be a logical structure. In other words, some units can be implemented by the same physical entity, or some units can be implemented by multiple physical entities or implemented jointly by some components in multiple independent devices.

In the above-mentioned embodiments, the hardware unit or module can be implemented in a mechanical manner or an electrical manner. For example, a hardware unit, a module, or a processor can include a dedicated permanent circuit or logic (for example, a dedicated processor, an FPGA, or an ASIC) to complete a corresponding operation. The hardware unit or the processor can further include a programmable logic or circuit (such as a general purpose processor or another programmable processor), and can be temporarily set by the software to complete a corresponding operation. A specific embodiment (a mechanical method, a dedicated permanent circuit, or a temporarily set circuit) can be determined based on cost and time considerations.

The previous describes example embodiments with reference to the accompanying drawings, but does not represent all embodiments that can be implemented or fall within the protection scope of the claims. The term "example" used throughout this specification means "used as an example, an instance, or an illustration" and does not mean "preferred" or "advantageous" over other embodiments. For the purpose of providing an understanding of the described technology, a specific implementation includes specific details. However, these technologies can be implemented without these specific details. In some instances, well-known structures and apparatuses are shown in block diagram forms, to avoid difficulty in understanding the concept in the described embodiments.

The previous descriptions of the present disclosure are provided to enable any person of ordinary skill in the art to implement or use the present disclosure. It is obvious to a person of ordinary skill in the art that various modifications can be made to the content of the present disclosure. In addition, the general principle defined in this specification can be applied to another variant without departing from the protection scope of the content of the present disclosure. Therefore, the content of the present disclosure is not limited to the examples and designs described in this specification, but is consistent with the widest range of principles and novelty features that conform to this specification.

What is claimed is:

1. A graph data loading method, comprising:
    obtaining, in response to obtaining to-be-loaded graph data, a lock for the to-be-loaded graph data;
    determining a graph data loading identifier of the to-be-loaded graph data based on a graph data loading identifier of previous loaded graph data stored in a graph data loading apparatus;
    releasing the lock obtained for the to-be-loaded graph data; and
    after releasing the lock, storing the to-be-loaded graph data at a corresponding storage location in a graph data storage space created in a local memory of a graph data processing device, wherein the corresponding storage location is determined based on the graph data loading identifier of the to-be-loaded graph data, wherein the graph data storage space comprises multiple memory blocks used to store graph data, each memory block has a fixed quantity of storage locations, a head address queue is maintained in the local memory of the graph data processing device, and the head address queue is used to sequentially store a head address of each memory block according to a creation time sequence; and wherein the method further comprises determining, based on the graph data loading identifier of the to-be-loaded graph data, a storage location of the to-be-loaded graph data in a graph data storage space created in a local memory of a graph data processing device, comprising:

determining a storage location index of the to-be-loaded graph data in the graph data storage space based on the graph data loading identifier of the to-be-loaded graph data, wherein the storage location index comprises a memory block index of a memory block and an offset in the memory block;

obtaining a head address of the memory block from the head address queue based on the memory block index; and determining the storage location of the to-be-loaded graph data in the graph data storage space according to the obtained head address of the memory block and the offset.

2. The graph data loading method according to claim 1, wherein storing the to-be-loaded graph data at the corresponding storage location in the graph data storage space comprises:

storing a data identifier and a data attribute of the to-be-loaded graph data at the corresponding storage location in the graph data storage space; or storing a data attribute of the to-be-loaded graph data at the corresponding storage location in the graph data storage space.

3. The graph data loading method according to claim 1, wherein a determining process of the storage location is performed before releasing the lock or after releasing the lock.

4. The graph data loading method according to claim 1, wherein storing the to-be-loaded graph data at the corresponding storage location in the graph data storage space comprises:

determining whether a data size of the to-be-loaded graph data exceeds a storage size of the corresponding storage location in the graph data storage space; and upon determining that the data size of the to-be-loaded graph data does not exceed the storage size of the corresponding storage location in the graph data storage space, storing the to-be-loaded graph data at the corresponding storage location in the graph data storage space; or upon determining that the data size of the to-be-loaded graph data exceeds the storage size of the corresponding storage location in the graph data storage space, applying for a memory space for the to-be-loaded graph data from a free memory in the local memory of the graph data processing device, storing the to-be-loaded graph data to the applied memory space, and storing a space address of the applied memory space at the corresponding storage location in the graph data storage space.

5. The graph data loading method according to claim 1, wherein storing the to-be-loaded graph data at the corresponding storage location in the graph data storage space comprises:

determining whether a data type of a data attribute of the to-be-loaded graph data comprises a variable type; and upon determining that the data type of the data attribute of the to-be-loaded graph data does not comprise the variable type, storing the to-be-loaded graph data at the corresponding storage location in the graph data storage space; or upon determining that the data type of the data attribute of the to-be-loaded graph data comprises the variable type, applying for a memory space for the to-be-loaded graph data from a free memory in the local memory of the graph data processing device, storing the to-be-loaded graph data to the applied memory space, and storing a space address of the applied memory space at the corresponding storage location in the graph data storage space.

6. The graph data loading method according to claim 1, wherein a mapping table used to record a mapping relationship between a data identifier of graph data and a graph data loading identifier is maintained in the graph data loading apparatus; and the graph data loading method further comprises:

after the graph data loading identifier of the to-be-loaded graph data is obtained, recording a mapping relationship between the obtained graph data loading identifier and a data identifier of the to-be-loaded graph data into the mapping table.

7. A graph data loading apparatus comprising a memory and a processor, wherein the memory stores executable instructions that, in response to execution by the processor, cause the processor to perform operations comprising:

obtaining, in response to obtaining to-be-loaded graph data, a lock for the to-be-loaded graph data;

determining a graph data loading identifier of the to-be-loaded graph data based on a graph data loading identifier of previous loaded graph data stored in a graph data loading apparatus;

releasing the lock obtained for the to-be-loaded graph data; and after releasing the lock, storing the to-be-loaded graph data at a corresponding storage location in a graph data storage space created in a local memory of a graph data processing device, wherein the corresponding storage location is determined based on the graph data loading identifier of the to-be-loaded graph data, wherein the graph data storage space comprises multiple memory blocks used to store graph data, each memory block has a fixed quantity of storage locations, a head address queue is maintained in the local memory of the graph data processing device, and the head address queue is used to sequentially store a head address of each memory block according to a creation time sequence; and wherein the operations further comprising:

determining, based on the graph data loading identifier of the to-be-loaded graph data, a storage location of the to-be-loaded graph data in a graph data storage space created in a local memory of a graph data processing device, comprising:

determining a storage location index of the to-be-loaded graph data in the graph data storage space based on the graph data loading identifier of the to-be-loaded graph data, wherein the storage location index comprises a memory block index of a memory block and an offset in the memory block:
obtaining a head address of the memory block from the head address queue based on the memory block index; and
determining the storage location of the to-be-loaded graph data in the graph data storage space according to the obtained head address of the memory block and the offset.

8. The graph data loading apparatus according to claim 7, wherein storing the to- be-loaded graph data at the corresponding storage location in the graph data storage space comprises:
storing a data identifier and a data attribute of the to-be-loaded graph data at the corresponding storage location in the graph data storage space; or
storing a data attribute of the to-be-loaded graph data at the corresponding storage location in the graph data storage space.

9. The graph data loading apparatus according to claim 7, wherein a determining process of the storage location is performed before releasing the lock or after releasing the lock.

10. The graph data loading apparatus according to claim 7, wherein storing the to- be-loaded graph data at the corresponding storage location in the graph data storage space comprises:
determining whether a data size of the to-be-loaded graph data exceeds a storage size of the corresponding storage location in the graph data storage space; and
upon determining that the data size of the to-be-loaded graph data does not exceed the storage size of the corresponding storage location in the graph data storage space, storing the to-be-loaded graph data at the corresponding storage location in the graph data storage space; or
upon determining that the data size of the to-be-loaded graph data exceeds the storage size of the corresponding storage location in the graph data storage space, applying for a memory space for the to-be-loaded graph data from a free memory in the local memory of the graph data processing device, storing the to-be-loaded graph data to the applied memory space, and storing a space address of the applied memory space at the corresponding storage location in the graph data storage space.

11. The graph data loading apparatus according to claim 7, wherein storing the to- be-loaded graph data at the corresponding storage location in the graph data storage space comprises:
determining whether a data type of a data attribute of the to-be-loaded graph data comprises a variable type; and
upon determining that the data type of the data attribute of the to-be-loaded graph data does not comprise the variable type, storing the to-be-loaded graph data at the corresponding storage location in the graph data storage space; or
upon determining that the data type of the data attribute of the to-be-loaded graph data comprises the variable type, applying for a memory space for the to-be-loaded graph data from a free memory in the local memory of the graph data processing device, storing the to-be-loaded graph data to the applied memory space, and storing a space address of the applied memory space at the corresponding storage location in the graph data storage space.

12. The graph data loading apparatus according to claim 7, wherein a mapping table used to record a mapping relationship between a data identifier of graph data and a graph data loading identifier is maintained in the graph data loading apparatus; and
the operations further comprise:
after the graph data loading identifier of the to-be-loaded graph data is obtained, recording a mapping relationship between the obtained graph data loading identifier and a data identifier of the to-be-loaded graph data into the mapping table.

13. A non-transitory computer-readable storage medium comprising instructions stored therein that, when executed by a processor of a computing device, cause the processor to perform operations comprising:
obtaining, in response to obtaining to-be-loaded graph data, a lock for the to-be-loaded graph data;
determining a graph data loading identifier of the to-be-loaded graph data based on a graph data loading identifier of previous loaded graph data stored in a graph data loading apparatus;
releasing the lock obtained for the to-be-loaded graph data; and
after releasing the lock, storing the to-be-loaded graph data at a corresponding storage location in a graph data storage space created in a local memory of a graph data processing device, wherein the corresponding storage location is determined based on the graph data loading identifier of the to-be-loaded graph data,
wherein the graph data storage space comprises multiple memory blocks used to store graph data, each memory block has a fixed quantity of storage locations, a head address queue is maintained in the local memory of the graph data processing device, and the head address queue is used to sequentially store a head address of each memory block according to a creation time sequence; and
wherein the operations further comprising:
determining, based on the graph data loading identifier of the to-be-loaded graph data, a storage location of the to-be-loaded graph data in a graph data storage space created in a local memory of a graph data processing device, comprising:
determining a storage location index of the to-be-loaded graph data in the graph data storage space based on the graph data loading identifier of the to-be-loaded graph data, wherein the storage location index comprises a memory block index of a memory block and an offset in the memory block;
obtaining a head address of the memory block from the head address queue based on the memory block index; and
determining the storage location of the to-be-loaded graph data in the graph data storage space according to the obtained head address of the memory block and the offset.

14. The non-transitory computer-readable storage medium according to claim 13, wherein storing the to-be-loaded graph data at the corresponding storage location in the graph data storage space comprises:
storing a data identifier and a data attribute of the to-be-loaded graph data at the corresponding storage location in the graph data storage space; or
storing a data attribute of the to-be-loaded graph data at the corresponding storage location in the graph data storage space.

15. The non-transitory computer-readable storage medium according to claim 13, wherein a determining process of the storage location is performed before releasing the lock or after releasing the lock.

16. The non-transitory computer-readable storage medium according to claim 13, wherein storing the to-be-loaded graph data at the corresponding storage location in the graph data storage space comprises:
  determining whether a data size of the to-be-loaded graph data exceeds a storage size of the corresponding storage location in the graph data storage space; and
  upon determining that the data size of the to-be-loaded graph data does not exceed the storage size of the corresponding storage location in the graph data storage space, storing the to-be-loaded graph data at the corresponding storage location in the graph data storage space; or
  upon determining that the data size of the to-be-loaded graph data exceeds the storage size of the corresponding storage location in the graph data storage space, applying for a memory space for the to-be-loaded graph data from a free memory in the local memory of the graph data processing device, storing the to-be-loaded graph data to the applied memory space, and storing a space address of the applied memory space at the corresponding storage location in the graph data storage space.

17. The non-transitory computer-readable storage medium according to claim 13, wherein storing the to-be-loaded graph data at the corresponding storage location in the graph data storage space comprises:
  determining whether a data type of a data attribute of the to-be-loaded graph data comprises a variable type; and
  upon determining that the data type of the data attribute of the to-be-loaded graph data does not comprise the variable type, storing the to-be-loaded graph data at the corresponding storage location in the graph data storage space; or
  upon determining that the data type of the data attribute of the to-be-loaded graph data comprises the variable type, applying for a memory space for the to-be-loaded graph data from a free memory in the local memory of the graph data processing device, storing the to-be-loaded graph data to the applied memory space, and storing a space address of the applied memory space at the corresponding storage location in the graph data storage space.

18. The non-transitory computer-readable storage medium according to claim 13, wherein a mapping table used to record a mapping relationship between a data identifier of graph data and a graph data loading identifier is maintained in the graph data loading apparatus; and
  the operations further comprise:
  after the graph data loading identifier of the to-be-loaded graph data is obtained, recording a mapping relationship between the obtained graph data loading identifier and a data identifier of the to-be-loaded graph data into the mapping table.

* * * * *